July 12, 1932.  H. PONTHIEU  1,867,470
COMPRESSOR
Filed Oct. 10, 1929  2 Sheets-Sheet 1
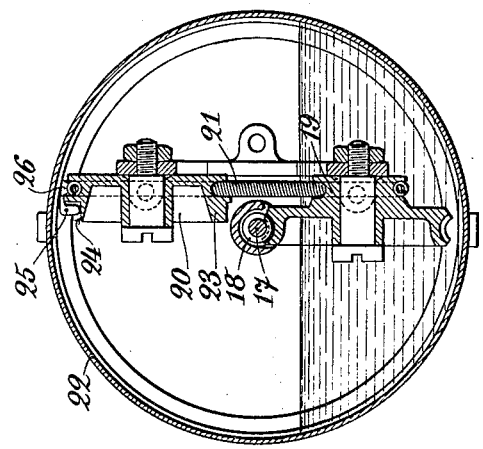
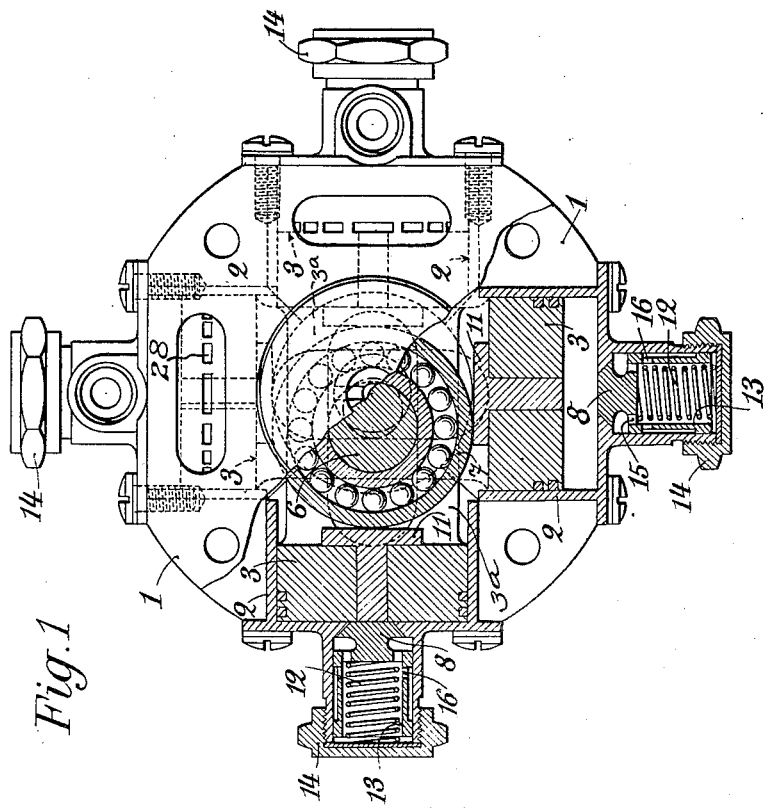
Inventor:-
Henri Ponthieu

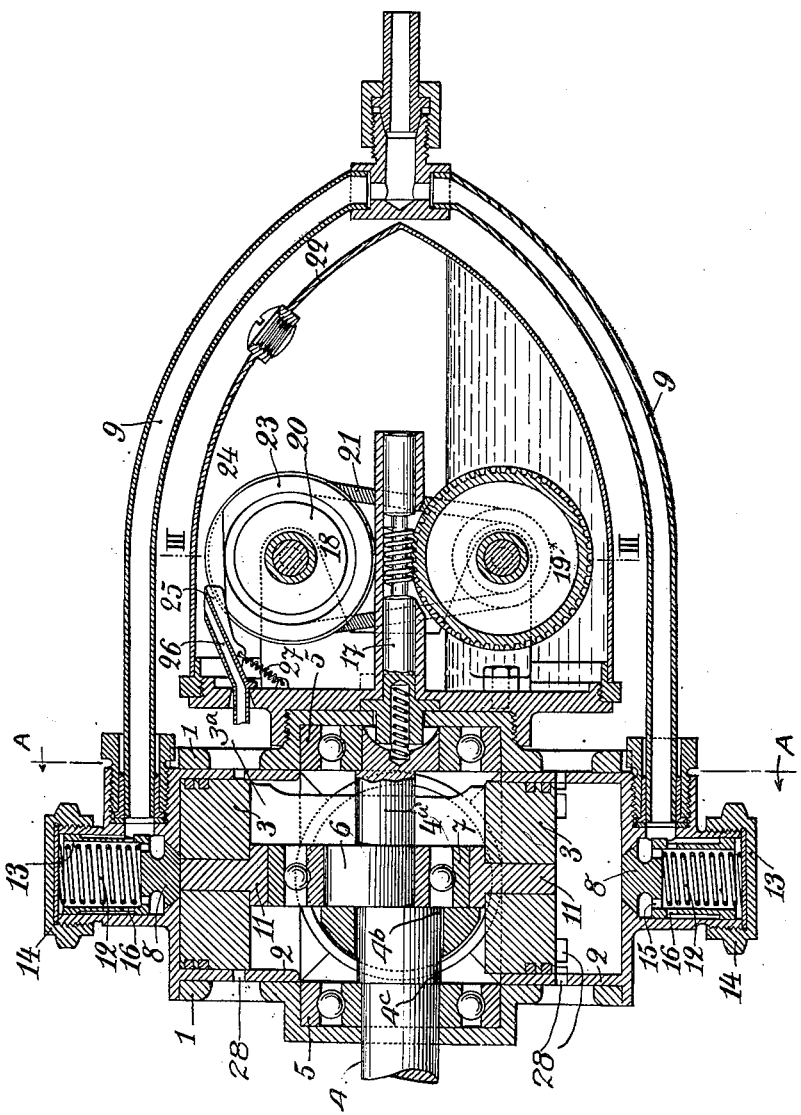

Patented July 12, 1932

1,867,470

UNITED STATES PATENT OFFICE

HENRI PONTHIEU, OF VIROFLAY, FRANCE

COMPRESSOR

Application filed October 10, 1929, Serial No. 398,766, and in France June 25, 1929.

The present invention has for its object a compressor of light weight, more specially devised for ensuring the possibility of operating at very high speeds, and simplicity and strength of the construction.

This compressor comprises four pistons, arranged cross-wise, rigid per pair, and driven by one and the same eccentric mounted on the shaft.

Thus, the apparatus does not include any links and joints and according to the invention, use is made, as an eccentric, of a ball bearing on which fit steel bearing discs or plates carried by the pistons.

The rubbing surfaces, and consequently the wear are reduced to the minimum, and the use of ball bearings allows to obtain very high speeds, while the known apparatuses of this kind are usually suitable for low speeds only.

For the same purpose, the bushings of the driving shaft are also provided with ball bearings.

Moreover, the apparatus according to the invention is disposed in such manner that the use of ball bearings does not involve any of the disadvantages which are usually met with in alternate machines which utilize them (particularly, the complication of the construction and of the mounting).

The distribution is effected as regards the exhaust by means of automatic valves returned on to their seats by springs; these valves are apertured in their guiding region, so as to allow the passage of the fluid on their rear face, in order to increase the action of their returning spring.

The admission takes place automatically through ports provided in the walls of the cylinders and uncovered at the required moment by the piston; this arrangement allows to avoid the use of valves and thus considerably simplifies the construction and operation of the apparatus, and lightens it at the same time.

The accompanying drawings illustrate, by way of example, a form of carrying out the subject matter of the invention.

Fig. 1 is an elevation of the compressor, partly in section according to line A—A of Fig. 2.

Fig. 2 is a section thereof, made through the shaft.

Fig. 3 is a cross section of the same, made according to line III—III of Fig. 2.

The compressor comprises two half-casings 1, between which four cylinders 2 are arranged crosswise.

In these cylinders move four pistons 3, rendered rigid per pair by means of stay members $3^a$.

A crank shaft 4 is journalled in ball bearings 5, arranged in the casing 1, and carries an eccentric 6 on which is fitted a ball bearing 7.

The stay members $3^a$ are provided with longitudinal grooves $3^b$, through which the crankshaft 4 passes, and which allow the alternate motion of the pistons.

The ball bearing 5 mounted in the right-hand casing is maintained in position by being clamped between the casing and an excentered part $4^a$ of the crank shaft. The diameter of the latter is smaller than the bore of the inner ring of the ball bearing 7 and allows to mount the same upon the crankshaft in threading the same from the end of the said shaft situated to the right of Fig. 2. The ball bearing 7 is maintained in position by a shoulder $4^b$ of the crank shaft and by the two stay members $3^a$.

Finally, the ball bearing 5 mounted in the left hand casing of Fig. 2 is held in position by being clamped between the casing and a shoulder $4^c$ of the crank shaft.

All of the said ball bearings, even the ball bearing 7 of the eccentric crank pin, can therefore easily be placed in position upon the crank shaft and do not cause any complication in the mounting.

Four exhaust valves 8 are arranged in the housings of the cylinders 2 connected by conduits 9 to the delivery header 10.

The pistons 3, made of a light alloy, bear, through bearing discs or plates 11, made of very hard steel, on the large ring of the ball bearing 7.

The valves 8 are returned on to their seats by springs 12, arranged in bores 13 and bearing against plugs 14 closing the cylinder housings and allowing the easy removal and cleaning of these valves.

Passage-ways 15 are provided for allowing the compressed fluid to pass in the bores 13 and to assist the action of the springs.

Moreover holes 16 provided in the peripheral guide portion of the valves allow to ensure the proper lubrication of the latter.

Suction takes place through ports 28 provided in the jackets 2 of the cylinders and are situated at such a height that they are uncovered by the pistons 3 when the latter come to the end of the suction stroke.

The compressor operates as follows:

Near the end of the compression stroke, the valve 8 raises so as to allow the compressed air to pass into the delivery or pressure pipes.

As soon as the piston has reached the high dead point and begins its suction stroke, the valve 8 closes again and, as the piston, continues its stroke, the interior of the cylinder is under vacuum.

The said vacuum, combined with the action of the spring 12 and the pressure of the compressed air acting upon the valve 8, secures a perfectly tight closure for the latter.

As soon as the piston uncovers the ports 28, the cylinder is filled with air.

The vacuum existing in the cylinder and the section of the ports 28 are such that the said filling takes place almost instantaneously. It is therefore possible to place the inlet or admission ports very close to the low dead point of the piston and to give its maximum value to the effective compression stroke.

Finally, every cylinder will preferably have a very large bore relatively to the piston stroke for a given cylinder content. Owing to this arrangement, the cooling surface of the fluid compressed within the cylinder is relatively important and avoids an excessive heating, notwithstanding the rapidity of the compression.

Moreover, the waste of energy due to frictions between the piston packing rings and the wall of the cylinder is less than in ordinary apparatuses which show generally the reverse arrangement (small bore and large stroke).

Another advantage of this arrangement is that the crankshaft can be given high rotation speeds without the pistons having too great a linear one; the inertia strains upon these organs are then reduced, and, moreover, the compression takes place in more advantageous conditions (less energy spent, and lower temperature of the air at the end of the compression stroke).

The whole of the above described arrangements secure to the apparatus a high efficiency. It allows to run at very high rates and to obtain relatively high air pressures, without it being necessary to provide cooling devices by means of water.

At its rear part, the crank-shaft 4 is cut away so as to receive and drive in its rotary movement a shaft 17 controlling the lubrication.

This shaft, through a worm 18, causes a pulley 19 to rotate, this pulley being connected to another pulley 20 arranged above the same, by means of an endless belt 21 constituted by a long coil spring.

This structure is enclosed in a fluid-tight casing 22 screwed on the casing 1.

The spring 21, the coils of which are slightly spaced apart, causes oil to rise from the lower part of the casing 22 to the upper part of the pulley 20.

This latter pulley has a flange 23 cut away so as to form a flat portion 24, on which bears an oil catcher 25 integral with the rocking tube 26 returned by a spring 27.

This tube is loosely mounted in the wall of the casing 22, so as to be able of rocking in the vertical plane of the pulley 20, and it is connected by a flexible pipe to the members to be lubricated; its end, cut on a bevel, extends a little further beyond its point of tangency with the periphery of the spring 21.

At each revolution of the pulley 20, the cam 25 moves down on to the flat portion 24, and the tube 26 comes in contact with the spring and collects a certain quantity of oil.

Of course, the flange 23, instead of having a single flat portion, might have two or more flat portions, or present any other profile, so as to increase the outflow of oil through the tube 26.

I claim:

1. A compressor comprising the combination of a crankshaft, an eccentric on said crank-shaft, four fixed cylinders arranged crosswise about the said shaft, in a plane at right angles, to its axis of revolution, pistons moving in the said cylinders, a ball bearing fitted upon the eccentric of the crank shaft, hard steel pieces respectively on each of the said pistons and bearing against the external ring of the said ball bearing; two stay members respectively connecting every group of two diametrally opposed pistons, ball bearings fitted upon the pivots of the crank shaft, and means for securing the delivery of the fluid to be compressed.

2. A compressor comprising the combination of a crank shaft, an eccentric on said crank shaft, four fixed cylinders arranged crosswise about the said shaft, in a plane at right angles to its axis of revolution, pistons moving in the said cylinders, means for securing the delivery of the fluid to be compressed, a ball bearing fitted upon the eccentric of the crank shaft, means for maintaining the pistons against the periphery of the said bearing, ball bearings fitted upon the pivots of the crank shaft, the said crank shaft comprising in the same order as hereafter mentioned, the following parts: a first pivot, a part projecting out of the circumference of this pivot, but not out of that of the eccentric herein after mentioned, an eccentric the diameter of which is greater than that of the preceding parts, a part projecting out of the circumference of the said eccentric of a second pivot hereinafter mentioned, and a second pivot.

In testimony whereof I have hereunto affixed my signature.

HENRI PONTHIEU.